(12) United States Patent
Allen

(10) Patent No.: US 6,624,609 B2
(45) Date of Patent: Sep. 23, 2003

(54) SOLAR POWERED MONITOR

(76) Inventor: Leonard G. D. Allen, 110 Ash Street, 2nd Floor, Whitby, Ontario (CA), L1N 4A9

( * ) Notice: Subject to any disclaimer, the term of this patent is extended or adjusted under 35 U.S.C. 154(b) by 0 days.

(21) Appl. No.: 10/013,713

(22) Filed: Dec. 13, 2001

(65) Prior Publication Data

US 2002/0070703 A1 Jun. 13, 2002

(30) Foreign Application Priority Data

Dec. 13, 2000 (CA) .............................................. 2328539

(51) Int. Cl.[7] .............................................. H01N 10/44
(52) U.S. Cl. ...................................................... 320/101
(58) Field of Search ........................ 320/101; 340/553, 340/573.1, 573.4, 573.7; 367/93; 307/64–66

(56) References Cited

U.S. PATENT DOCUMENTS

| | | | | |
|---|---|---|---|---|
| 3,768,014 A | * | 10/1973 | Smith et al. ............. 324/158.1 |
| 3,795,899 A | * | 3/1974 | Cade ........................... 340/527 |
| 4,551,980 A | | 11/1985 | Bronicki ....................... 60/698 |
| 4,633,418 A | | 12/1986 | Bishop ......................... 702/63 |
| 4,888,702 A | | 12/1989 | Gerken et al. .............. 700/295 |
| 5,321,627 A | | 6/1994 | Reher ........................... 702/63 |
| 5,563,456 A | | 10/1996 | Berger .......................... 307/66 |
| 5,650,773 A | | 7/1997 | Chiarello ................. 340/691.8 |
| 5,731,785 A | | 3/1998 | Lemelson et al. ..... 342/357.07 |
| 5,790,022 A | | 8/1998 | Delvecchio et al. ........ 340/539 |
| 5,790,024 A | | 8/1998 | Ripingill, Jr. et al. ...... 340/565 |
| 5,959,534 A | * | 9/1999 | Campbell et al. ........ 340/573.6 |
| 6,018,300 A | * | 1/2000 | Dowden et al. ............. 340/635 |
| 6,052,052 A | | 4/2000 | Delmonaco .................. 340/539 |
| 6,064,310 A | * | 5/2000 | Busak et al. ................. 340/588 |
| 6,118,375 A | | 9/2000 | Duncan ........................ 340/541 |
| 6,127,926 A | | 10/2000 | Dando ......................... 340/541 |
| 6,133,842 A | | 10/2000 | Gariepy ....................... 340/689 |
| 6,147,609 A | | 11/2000 | Spies ........................ 340/573.2 |
| 6,252,380 B1 | | 6/2001 | Koenck ........................ 320/150 |
| 6,255,942 B1 | | 7/2001 | Knudsen ..................... 340/506 |

FOREIGN PATENT DOCUMENTS

| | | |
|---|---|---|
| CA | 1 150 359 | 7/1983 |
| CA | 1 200 284 | 2/1986 |
| CA | 1285617 | 7/1991 |
| CA | 2129686 | 8/1993 |
| CA | 2248349 | 9/1997 |
| CA | 2176097 | 5/1999 |
| GB | 2 266 800 A | 11/1993 |

* cited by examiner

Primary Examiner—Edward H. Tso
Assistant Examiner—Pia Tibbits
(74) Attorney, Agent, or Firm—Birch, Stewart, Kolasch & Birch, LLP

(57) ABSTRACT

A solar powered monitor is powered by a photovoltaic solar module. The monitor measures the electrical output from the solar module and records the length of each interval of time during which the electrical output is below a predetermined value. The length of those intervals is accumulated and periodically displayed to determine the operability of the solar module. The module can be used to provide power for surveillance and for other uses.

13 Claims, 4 Drawing Sheets

SOLAR POWERED MONITOR

This invention relates to a solar-powered monitor and more particularly to a solar-powered monitor for checking the operability of the solar-module, for providing surveillance over a defined area and for other uses.

Monitors which maintain surveillance over banks, factories, offices and the like are well known. In some such devices, cameras are used to monitor a defined area while in others, sensors such as pressure switches, motion detectors, glass breakage detectors and the like activate an alarm. Such devices are activated by electrical energy derived from conventional sources such as hydro electric power, coal-fired generators and so on. Such energy is supplemented by batteries in the event of an interruption in power.

A shortcoming of conventional monitors is that they cannot be used in locations where conventional sources of energy are unavailable. Such power is not available in vast areas of the arctic, for example, and conventional monitors cannot be used there. In other areas, such power may be available but at such high cost that the benefit from a monitor may be overridden by the cost of supplying it wit such power.

I have invented a solar powered monitor which is suitable for use in remote locations where conventional sources of electrical power are not available or where the cost of supplying the monitor with such power is prohibitive. The monitor can be installed where it is most suited for use without regard to the availability of conventional power.

Power is derived from a bank of solar cells commonly referred to as a "solar module". The module may not generate power during daylight hours because it is defective or because it is deliberately or accidentally shielded from the sun. To detect is, the electrical output from the solar module is continuously or periodically monitored so that if the module fails to generate a predetermine electrical output, his information is relayed to a manned station where steps can be taken to remedy the situation.

A micro-controller is used to monitor the fluctuations in electrical output from the solar module over a given period of time. The controller does so by measuring the length of each interval or period of time during which the output falls below a given value. The length of that interval is added to the of previous like time intervals. The accumulated length of such time intervals is stored in memory and when it reaches a predetermined value or when a given period of time has elapsed, the micro-controller relays that information to the manned station.

By way of example, the micro-controller might be programmed to measure the accumulated lengths of time intervals that the output from the solar modulo was below 10 milliamperes. When the accumulated lengths of time intervals reached a predetermined value, for example 2 hours, the contoller would send a signal to the manner station. Alternatively, the micro-controller would be programmed, a the end of every 24 hours, to report a number to the manned station. The number might be 15.5 which would represent the accumulated total of all such intervals of time during that 24 hour period It is important to note that the monitor of the invention is not intended to report each instance when the output from the solar module is below the given value. What it is intended to do is to accumulate the lengths of all such time intervals until those lengths reach a predetermine value. Alternatively the monitor accumulates the lengths of such time intervals over a predetermined period of time.

The time of year and climatic occurrences, such as heavy clouds, rain, snow must be taken into account to interpret the information generated by the micro-processor. If, for example, there was a heavy cloud cover for a period of 2 hours during daylight hours of the 24 hour period, the monitor would be expected to report a period of 2 hours plus the number of night-time hours during that 24 hour period. If the monitor reported a higher number than this, there could be a problem. The solar module, for example, could be defective or the module could be deliberately shielded from the sun.

The monitor of the invention is intended to report problems that occur over a relatively lengthy period. While that period is adjustable and can be shortened to the point where the monitor effectively reports problems as they occur, this is not the primary function of the monitor. The monitor is intended for use in remote location where measures to correct a problem cannot be taken immediately because, for example, there is no one in the vicinity of the monitor to do so. The monitor's primary function is to record and transmit information that reflects a problem which may exist for a lengthy period of time and which will not, under normal circumstances, be corrected immediately.

A rechargeable battery is provided for storing energy from the solar module. That energy is available when the module fails to generate sufficient energy to activate the monitor such as at night. Thus the monitor continues to operate even tough the solar module may be defective or the module my be deliberately shielded from the sun.

A temperature sensor measures ambient temperature surrounding the battery and adjusts the voltage of the electrical output of the solar module according to changes in such temperature. Optimal conditions for charging the battery are accordingly maintained.

Briefly, the solar-powered monitor of the invention includes a photovoltaic solar module; measuring means for measuring the electrical output from the solar module; first timing means for measuring the length of each interval of time during which the electrical output measured by the measuring means is below a predetermined value; memory means for recording the accumulation of all time intervals measured during the predetermined period of time; and means for displaying the accumulation thus recorded when the accumulation reaches a predetermined value.

A second embodiment of the solar-powered monitor includes a photovoltaic solar module; measuring means for measuring the electric output from the solar module; first timing means for measuring the length of each interval of time during which the electrical output measured by the measuring means is below a predetermined value; second timing means for measuring a predetermined period of time; memory means for recording the accumulation of all time intervals measured during the predetermined period of time; and means for displaying the accumulation thus recorded.

The solar-powered monitor is described with reference to the accompanying drawings in which.

Like reference characters to like parts throughout the, drawings.

Figure 1:
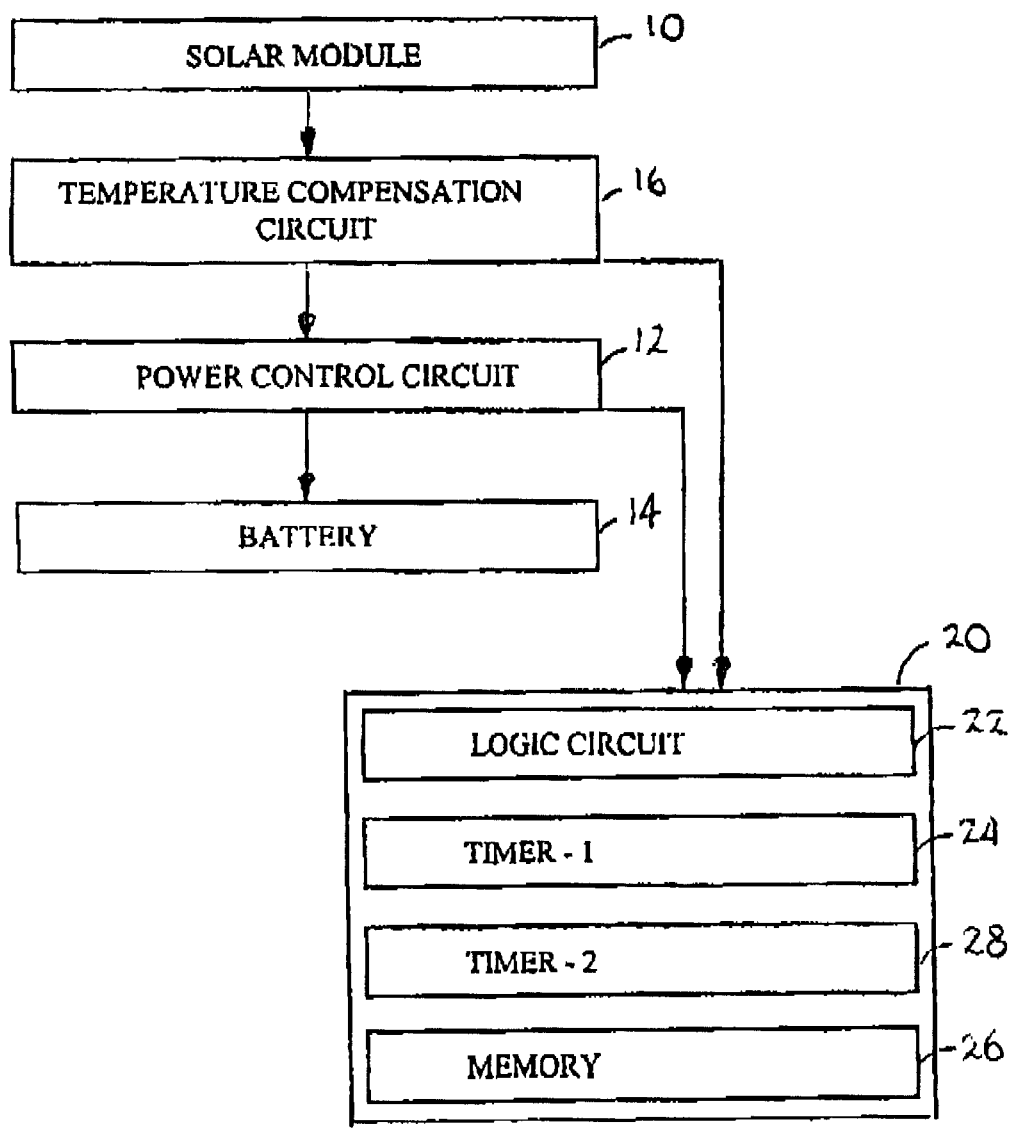
FIG. 1 is a flowchart showing the interrelationship between the main components of tie solar-powered monitor of the invention.

With reference to FIG. 1, a solar module 10 is connected through a power control circuit 12 to battery 14 for charging the battery and for supplying current to the circuits described below. Temperature compensation circuit 16 includes a temperature sensor which measures the ambient temperature surrounding the battery. The temperature measurements are communicated to a microcontroller 20. The micro-controller includes a logic circuit 22, first timer 24, a memory 26. In a second embodiment of the invention, the micro-controller includes a second timer 28.

The solar module is in the form of an array of photo-voltaic cells (not illustrated) such as one sold under the trade mark "Solar Module ST5" by Siemens Solar Industries of Camarillo, Calif., U.S.A.

Figure 2:
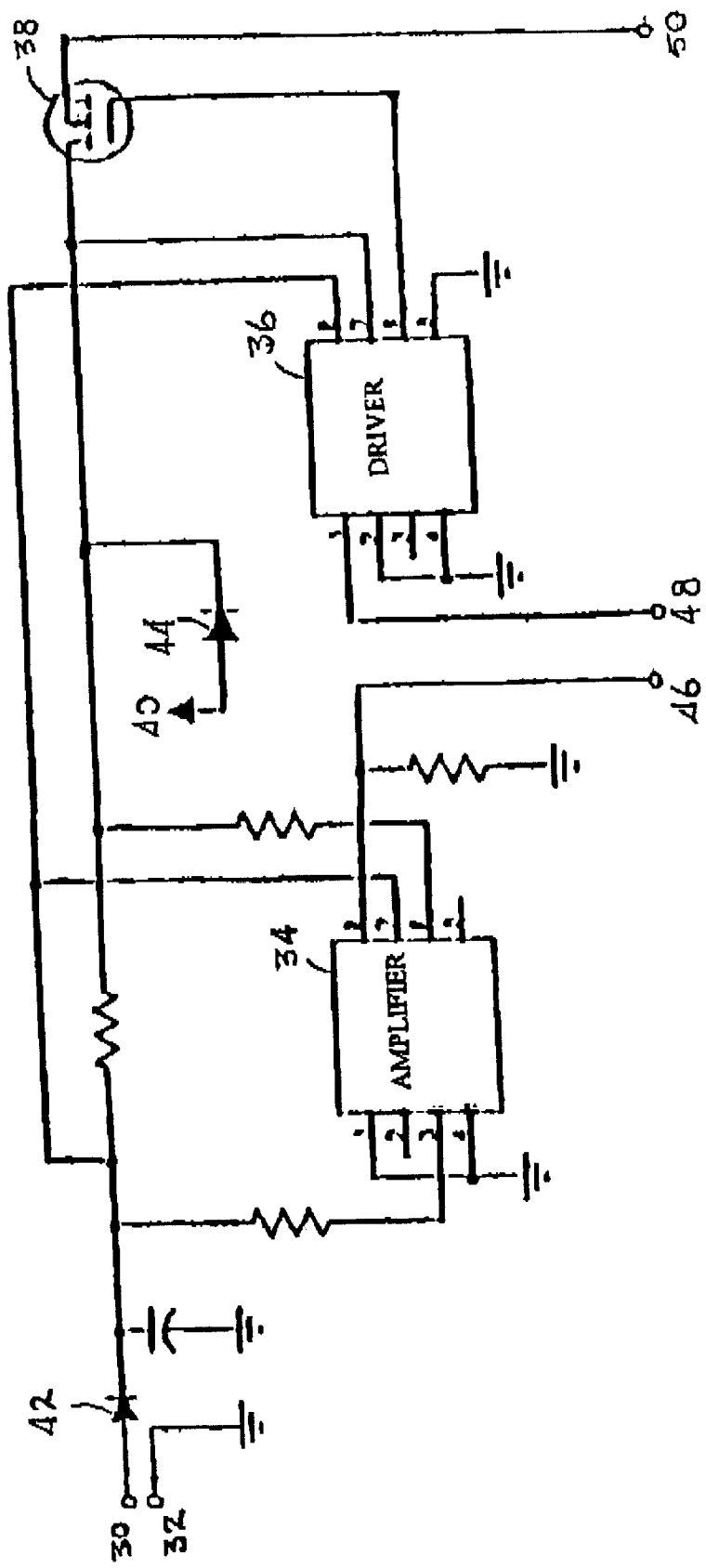
FIG. 2 is a diagram of the power control circuit.

With reference to FIG. 2, the solar module is connected to the power control circuit at pins 30, 32 The circuit includes a precision high-side amplifier 34, a high side driver 36 and a field effect power 38. Pin 40 is connected to the power source and diodes 42 and 44 control the direction of flow of the current. Diode 42 for example prevents current from the battery from flowing into the solar module. Pins 46, 48 connect the power control circuit to the micro-controller and pin 50 connects the circuit to the voltage divider and reference circuit.

Figure 3:
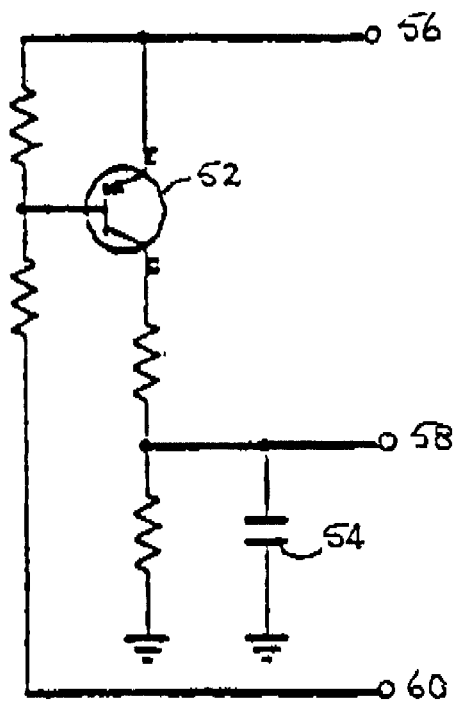
FIG. 3 is a diagram of the voltage divider and reference circuit.

With reference to FIG. 3, the circuit includes a transistor 52, capacitor 54 and a number of resistors. Pin 56 connects the circuit to pin 50 of the power control circuit and pins 58, 60 connect the circuit to the micro-controller. The circuit serves as a voltage divider and reference circuit that continuously informs the micro-controller of the relative battery voltage. Such information allows the micro-controller to generate a signal if the battery voltage drops below a pre-determined level.

Figure 4:
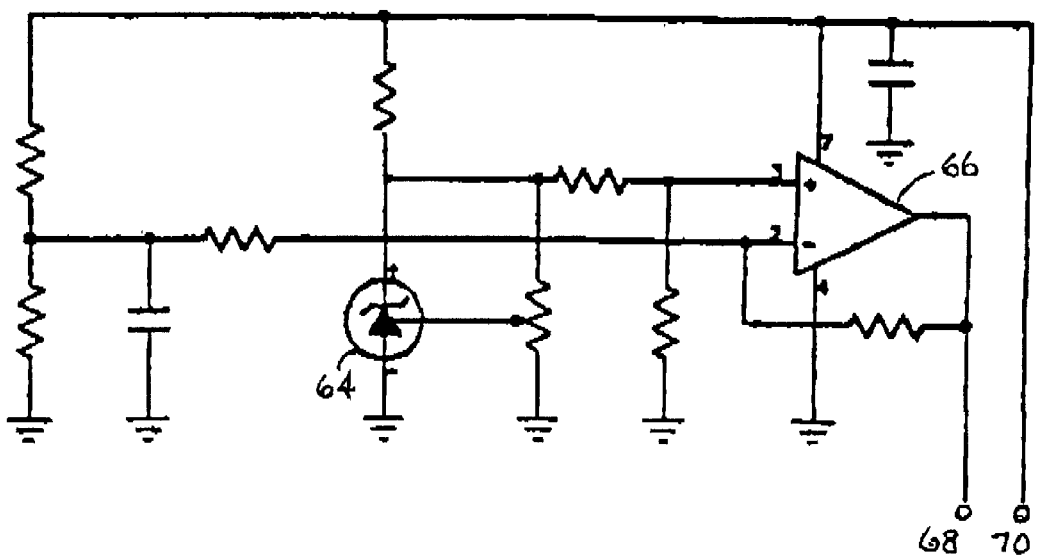
FIG. 4 is a diagram of the temperature component station circuit.

With reference to FIG. 4 the temperature compensation circuit includes a temperature sensor 64 and an amplifier 66. The sensor detects ambient temperature in the vicinity of the battery. Pins 68 and 70 are connected to the micro-controller. The sensor sends a signal to the micro-controller which in turn instructs the power control circuit top pulse-width modulate the output from the solar module. Optimal conditions for charging the battery are accordingly maintained.

Figure 5:
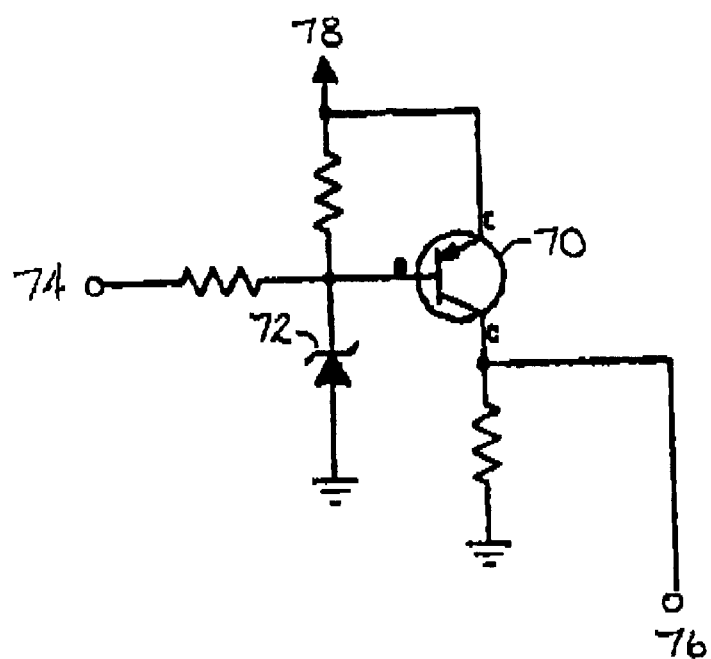
FIG. 5 is a diagram of the alarm sensing circuit.

With reference to FIG. 5, the circuit includes a transistor 70 and a diode 72. Pin 74 is connected to a switch which is tripped when an unauthorized intrusion has been detected. The means for detecting the intrusion can be a motion detector, a switch which opens when a door or window is opened and so on. Pin 76 is connected to the micro-controller and the circuit is connected to the source of power at 78.

When an intrusion occurs, transistor 70 sends a signal to the micro-processor. Diode 72 is a transient suppressor and protects the circuit from surges.

The operation of the monitoring device of the invention is as follows: When the current generated by solar module falls below a predetermined value, first timer 24 of the micro-processor is actuated. The timer measures the interval of time elapse from the moment the level of current falls below the predetermined level to the moment that it rises to that level. That measurement is stored in memory 26.

The length of time of each subsequent time interval during which the current level is below the predetermined value is added to the length of the previous time intervals in memory 26.

The micro-controller is utilized to perform all the calculations and to control all the operations. It includes a memory chip and a logic circuit which contains the operational software or particular control algorithm. A suitable micro-controller for this purpose is model PIC 16F 877-04/P manufactured by Micro Technology Inc.

When the lengths of time accumulate to a predetermined value, a signal generated which is displayed on a display board at the site of the monitor or is transmitted to a remote location.

According to a second embodiment of the invention, second timer 28 activates the logic circuit 22 such as every 24 hours to generate a signal which indicates the total amount of time elapsed during that 24 hour period when the current was below the predetermined value.

The means by which the micro-controller transits information to a remote location or to a display board at the site of the monitor is convectional, being known to those skilled in the art, and is not considered to form a part of the claimed invention. For example, a LED (not illustrated) can indicate whether the system is armed or disarmed and whether or not there has been an intrusion or solar loss during the last armed period A key pad (not illustrated) allows a user to configure the alarm functions, the solar functions, the predetermined period of time measured by the second timer and to adjust the voltage which the voltage divider and reference circuit will interpret as too low and will cause the circuit to so notify the micro-controller.

It will be understood of course that modifications can be made in the solar-powered monitor described herein without departing from the scope and purview of the invention as defined in the appended claims.

I claim:

1. A solar powered monitor comprising:
   a photovoltaic solar module;
   measuring means for measuring an electrical output from said solar module;
   timing means for measuring a length of each interval of time during which the electrical output measured by said measuring means is below a first predetermined value;
   memory means for recording an accumulation of all said intervals of time; and
   means for displaying said accumulation thus recorded when said accumulation reaches a record predetermined value.

2. The monitor as claimed in claim 1 further including energy storing means electrically connected to said solar module and charged by the electrical output from said solar module.

3. The monitor as claimed in claim 2 further including a sensor for monitoring an ambient temperature in which said energy storing means operates; and means for adjusting a voltage of the electrical output of said solar module according to changes in said temperature.

4. The monitor as claimed in claim 1 further including a sensor for maintaining surveillance over a predetermined object and for generating an input signal in response to said surveillance; and means for displaying an output signal in response thereto.

5. The monitor as claimed in claimed in claim 4 further including energy storing means electrically connected to said solar module and charged by the electrical output from said solar module.

6. The monitor as claimed in claim 5 further including a sensor for monitoring ambient temperature in which said energy storing means operates; and means for adjusting a voltage of the electrical output of said solar module according to changes in said temperature.

7. A solar powered monitor comprising:
   a photovoltaic solar module;
   measuring means for measuring an electrical output from said solar module;
   first timing means for measuring a length of each interval of time during which the electrical output measured by said measuring means is below a predetermined value;
   second timing means for measuring a predetermined period of time;
   memory means for recording an accumulation of all said intervals of time measured during said predetermined period of time; and
   means for displaying said accumulation thus recorded.

8. The monitor as claimed in claim 7 further including energy storing means electrically connected to said solar module and charged by the electrical output from said solar module.

9. The monitor as claimed in claim 8 further including a sensor for monitoring ambient temperature in which said energy storing means operates; and means for adjusting a voltage of the electrical output of said solar module according to changes in said temperature.

10. The monitor as claimed in claim 7 further including a sensor for maintaining surveillance over a predetermined object and for generating an input signal in response to said surveillance; and means for displaying an output signal in response thereto.

11. The monitor as claimed in claimed claim 10 further including energy storing means electrically connected to said solar module and charged by the electrical output from said solar module.

12. The monitor as claimed in claim 11 further including a sensor for monitoring an ambient temperature in which said energy storing means operates; and means for adjusting the voltage of the electrical output of said solar module according to changes in said temperature.

13. A solar powered monitor comprising:
   a photovoltaic solar module;
   energy storing means electrically connected to said solar module and charged by the electrical output from said solar module;
   current measuring means for measuring the electrical output from said solar module;
   a controller electrically activated by said energy storing means and having a first timing means for measuring a length of each interval of time during which a current measured by said current measuring means is below a predetermined value;
   a second timing means for measuring a predetermined period of time,
   memory means for recording an accumulation of all said intervals of time measured during said predetermined period of time and for generating an input to said controller responsive to said accumulation thus recorded;
   a sensor for maintaining surveillance over a predetermined object and for sending an input signal to said controlled in response to said surveillance;
   a sensor for monitoring an ambient temperature surrounding said energy storing means and for adjusting a voltage of the electrical output of said solar module according to changes in said temperature, said
   controller having mean for detecting said input signals and for generating an output signal in response thereto.

* * * * *